(12) United States Patent
Lasell et al.

(10) Patent No.: US 10,730,628 B2
(45) Date of Patent: Aug. 4, 2020

(54) AIRCRAFT SEAT BACK WITH NON-TUBULAR PERIMETER FLANGE

(71) Applicant: Safran Seats USA LLC, Gainesville, TX (US)

(72) Inventors: Donald M. Lasell, Denton, TX (US); Justin K. Murnan, Whitesboro, TX (US); Ali Mohiti Asli, Frisco, TX (US); Jeffrey L. Sikorski, Melissa, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/081,052

(22) PCT Filed: Aug. 5, 2016

(86) PCT No.: PCT/US2016/045856
§ 371 (c)(1),
(2) Date: Aug. 30, 2018

(87) PCT Pub. No.: WO2017/155566
PCT Pub. Date: Sep. 14, 2017

(65) Prior Publication Data
US 2019/0071183 A1    Mar. 7, 2019

Related U.S. Application Data

(60) Provisional application No. 62/306,383, filed on Mar. 10, 2016.

(51) Int. Cl.
*B60N 2/64* (2006.01)
*B64D 11/06* (2006.01)
(Continued)

(52) U.S. Cl.
CPC ........ *B64D 11/0649* (2014.12); *B29C 70/086* (2013.01); *B29C 70/682* (2013.01);
(Continued)

(58) Field of Classification Search
CPC ... B64D 11/06; B64D 11/0619; B64D 11/064; B64D 11/0649; B64D 2/686;
(Continued)

(56) References Cited

U.S. PATENT DOCUMENTS

| 4,498,649 A * | 2/1985 | Toll ........................ B64D 11/06 244/118.6 |
| 4,630,864 A * | 12/1986 | Toll ........................ B64D 11/06 297/216.1 |

(Continued)

FOREIGN PATENT DOCUMENTS

| GB | 2167291 | 5/1986 |
| GB | 2515576 | 12/2014 |

(Continued)

OTHER PUBLICATIONS

International Patent Application No. PCT/US2016/045856, International Search Report and Written Opinion, dated Oct. 24, 2016.

*Primary Examiner* — Shin H Kim
(74) *Attorney, Agent, or Firm* — Kilpatrick Townsend & Stockton LLP

(57) ABSTRACT

Described are seat backs (102) for aircraft passenger seats (100). Such a seat back (102) can include a unitary structural core (112) formed as a single piece that includes a body (138) and a flange (140). The body (138) and the flange (140) can each include carbon fiber composite material. The flange (140) can include portions extending from the rearward-facing side (132) of the body respectively along a left lateral side edge, a top (134) side edge, and a right lateral side edge of the unitary structural core (112). The flange (140) can be non-tubular.

18 Claims, 13 Drawing Sheets

(51) Int. Cl.
*B29C 70/08* (2006.01)
*B29C 70/68* (2006.01)
*B29C 70/70* (2006.01)
*B29K 63/00* (2006.01)
*B29K 307/04* (2006.01)
*B29L 31/00* (2006.01)

(52) U.S. Cl.
CPC .............. *B29C 70/70* (2013.01); *B64D 11/06* (2013.01); *B64D 11/0619* (2014.12); *B29K 2063/00* (2013.01); *B29K 2307/04* (2013.01); *B29L 2031/771* (2013.01); *B64D 11/0638* (2014.12); *B64D 11/0647* (2014.12); *Y02T 50/46* (2013.01)

(58) Field of Classification Search
CPC ...... B64D 2/682; B64D 2/68; B64D 2205/35; B64D 2/366; B64D 11/0647; B64D 11/0696; Y10S 297/02; Y10S 297/01; Y10S 5/952
See application file for complete search history.

(56) References Cited

U.S. PATENT DOCUMENTS

| | | | | |
|---|---|---|---|---|
| 7,954,762 | B2* | 6/2011 | Boren | B60N 2/995 |
| | | | | 244/122 R |
| 8,870,291 | B2* | 10/2014 | Pozzi | B60N 2/68 |
| | | | | 297/452.13 |
| 9,145,081 | B2* | 9/2015 | Pozzi | B60N 2/68 |
| 10,442,330 | B2* | 10/2019 | Le | B60N 3/004 |
| 2013/0119743 | A1* | 5/2013 | Evans | B60N 2/68 |
| | | | | 297/452.18 |
| 2014/0327286 | A1* | 11/2014 | Pozzi | B60N 2/68 |
| | | | | 297/391 |
| 2015/0314501 | A1* | 11/2015 | Maslakow | B60N 2/64 |
| | | | | 297/452.18 |
| 2017/0158104 | A1* | 6/2017 | Le | B60N 2/682 |
| 2019/0071183 | A1* | 3/2019 | Lasell | B64D 11/06 |

FOREIGN PATENT DOCUMENTS

| | | |
|---|---|---|
| WO | 1982003366 | 10/1982 |
| WO | 1985002384 | 6/1985 |

* cited by examiner

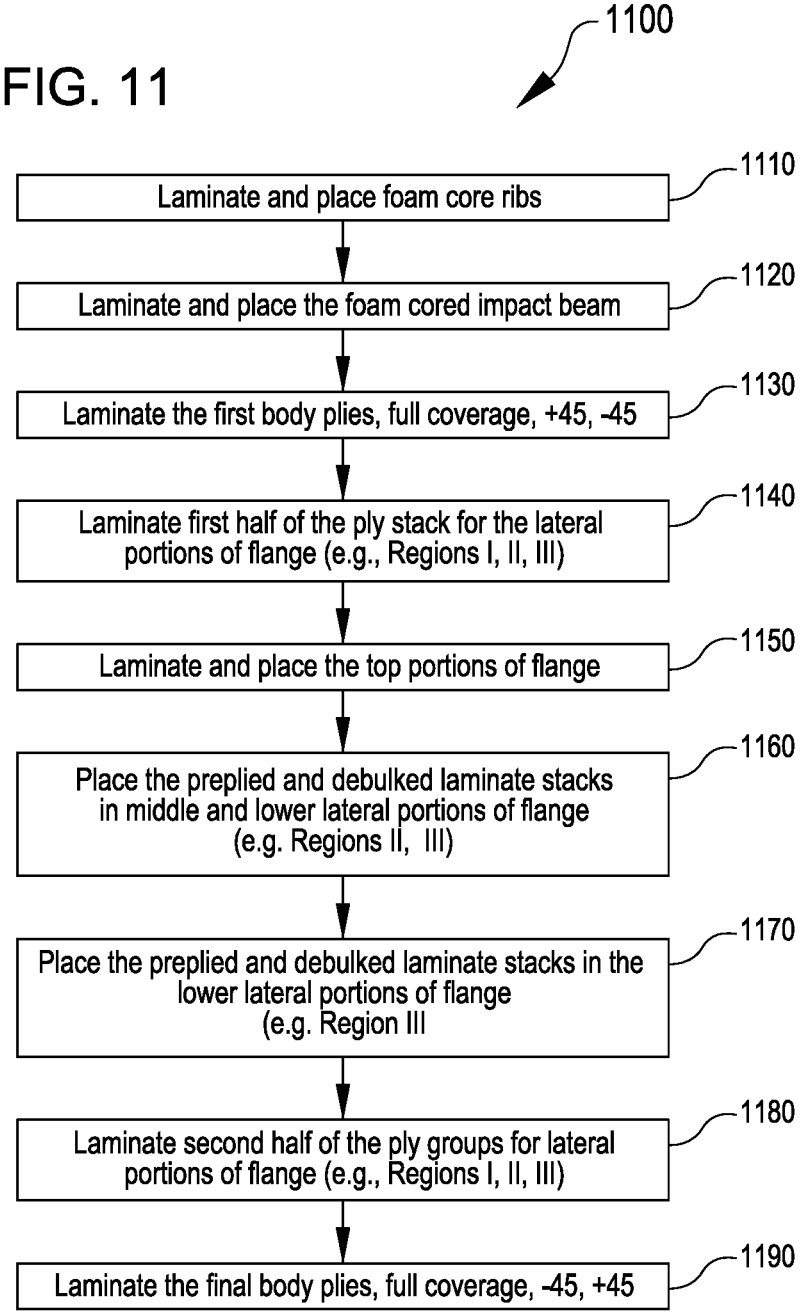

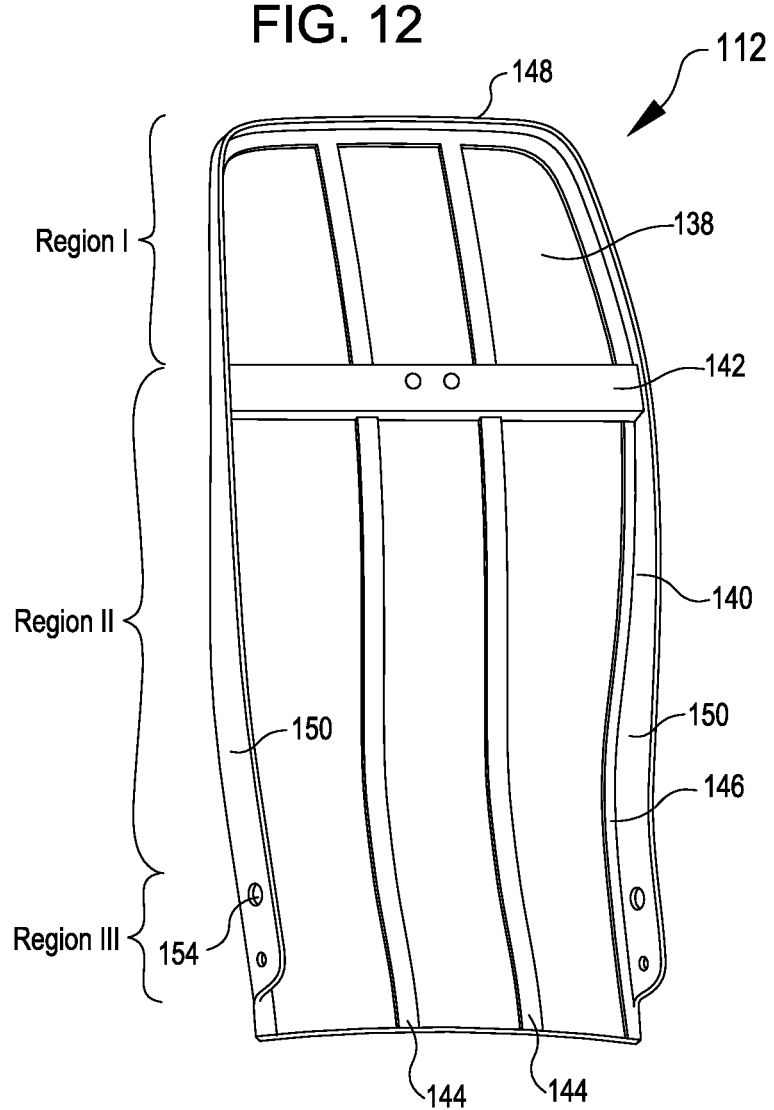

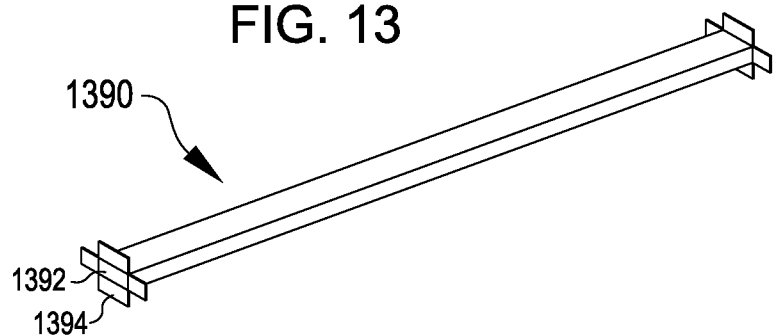
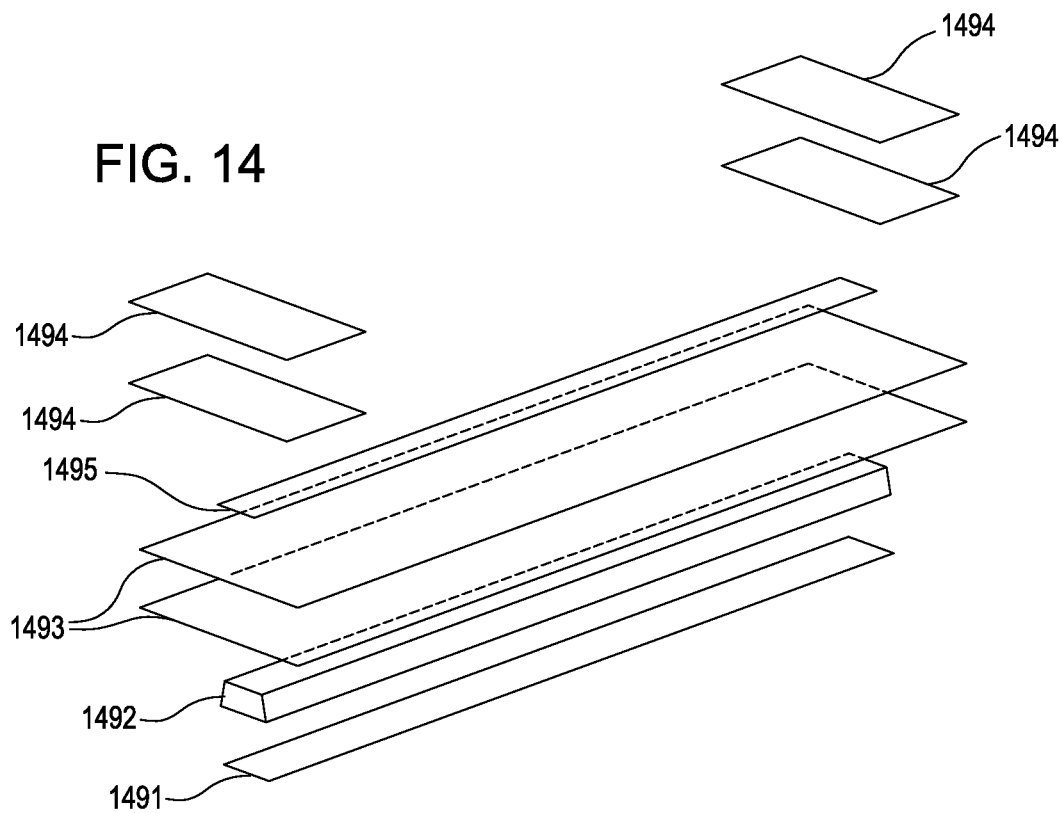

AIRCRAFT SEAT BACK WITH NON-TUBULAR PERIMETER FLANGE

CROSS REFERENCE TO RELATED APPLICATIONS

This application is related to and claims priority benefits from U.S. Provisional Application Ser. No. 62/306,363, filed on Mar. 10, 2016 entitled COMMERCIAL AIRCRAFT SEATING SEAT BACK DESIGN, which is hereby incorporated in its entirety by this reference.

FIELD OF THE INVENTION

The field of the invention relates to seat backs of seats for passenger vehicles such as aircraft.

BACKGROUND

Many vehicles such as passenger aircraft, buses, trains, and the like include seats for bearing passengers en route to a destination. A number of factors affect suitability of such passenger seats. Generally, such passenger seats are subject to safety requirements established by governments or other standard-setting organizations. At the same time, passenger comfort of using or interacting with a passenger seat is often an important consideration. Additionally, a seat's weight (e.g., which may directly affect an amount of fuel and corresponding cost to bear the seat between destinations) and general costs associated with a seat (e.g., cost of production, cost of installation, or cost of maintenance) are generally desirably reduced to reduce overall operating costs. Moreover, airlines or other passenger craft operators will often specify that a seat be of a particular size (e.g., have a specific maximum width or other dimension or fit within a specific footprint or area). Specified seat sizes may allow seats to be fit into existing spaces in aircraft or other vehicles. This may in turn allow old seats to be replaced and/or allow enough seats to be installed to yield sufficient revenue through corresponding fares for offsetting operating cost of the aircraft.

In many situations, however, various of these considerations may conflict with one another. For example, modifying a seat to improve passenger comfort in some cases may result in changes that negatively affect weight, safety, size, cost, or other factors. Accordingly, seats are desirable that can provide improvements in any one of these considerations while remaining within given parameters for the other considerations.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present disclosure, a seat back for a passenger seat in an aircraft is provided. The seat back can include a unitary structural core formed as a single piece. The unitary structural core can include a body and a non-tubular flange. The body can include carbon fiber composite material. The body further can include a forward-facing side and a rearward-facing side. The non-tubular flange can include carbon fiber composite material. The non-tubular flange can be integrally formed with the body and can include portions extending from the rearward-facing side of the body respectively along a left lateral side edge, a top side edge, and a right lateral side edge of the unitary structural core.

In some embodiments, the non-tubular flange can include a depth extending rearwardly from the rearward-facing side of the body. The non-tubular flange may include a thickness. The thickness may be transverse to the depth. The thickness may correspond to a distance between an inward-facing side of the non-tubular flange and an outward-facing side of the non-tubular flange. The non-tubular flange may include solid material spanning the thickness.

In some embodiments, the thickness of the non-tubular flange varies such that the thickness of the non-tubular flange is greater near a bottom of the unitary structural core than near a top of the unitary structural core.

In some embodiments, seat back further can include at least one rib positioned along the rearward-facing side of the body along at least part of a distance between a top and a bottom of the unitary structural core. The at least one rib may be formed of a layered structure that can include a foam core covered by at least one ply.

In some embodiments, the seat back further can include a cross-beam positioned along the rearward-facing side of the body and spanning between portions of the non-tubular flange at opposite lateral side edges of the unitary structural core. The cross-beam may be formed of a layered structure that can include a foam core covered by at least one ply.

In some embodiments, the cross-beam is located on the unitary structural core at an upper position so as to absorb energy during a passenger head-impact event.

In some embodiments, the seat back further can include a rim integrally formed with the body. The rim can include portions extending rearwardly from the rearward-facing side of the body along the inward-facing side of the non-tubular flange.

According to certain embodiments of the present disclosure, passenger seat can include a seat pan and a seat back unitary structural core. The seat back unitary structural core can include a flange extending rearwardly along top and lateral portions of a perimeter of the core. The flange can include carbon fiber composite material. The flange can have a rearward depth and a thickness transverse to the rearward depth. The thickness can correspond to a distance between exterior sides of the flange. The flange can include solid material spanning the entire thickness through the entire rearward depth at least along some portion of the flange.

In some embodiments, the passenger seat further can include at least one of cushioning or a headrest mounted to a front of the seat back unitary structural core. The passenger seat further may include a monitor mounted to a rear of the seat back unitary structural core.

In some embodiments, the flange can include a bore extending through the thickness and exterior sides of the flange. The seat back unitary structural core may be configured for pivoting about a shaft received by the bore. The thickness of the flange may be configured to permit the shaft to bear against the bore without a bushing extending to another load-bearing surface.

In some embodiments, the passenger seat further can include a cross-beam spanning between portions of the flange at opposite lateral side edges of the seat back unitary structural core. The cross-beam may be configured to support a monitor at least partially within a space bounded by the cross-beam and the flange.

In some embodiments, the seat back unitary structural core can include a first region, a second region, and a third region. The first region may extend above the cross-beam. The third region may include the bore and a portion of the flange extending below the bore. The second region may be located between the first region and the third region. At least one of the thickness of the flange or the rearward depth of the flange may vary so as to be less in the first region than in the second region and less in the second region than in the third region.

In some embodiments, the seat back unitary structural core can include at least two ribs extending rearwardly and located along at least part of a distance between a top and a bottom of the seat back unitary structural core. Each of the at least two ribs may be formed as a layered structure that can include a foam core covered by at least one ply.

In some embodiments, the seat back unitary structural core can include a rim integrally formed along at least some of the perimeter of the core and can include portions extending rearwardly from a rearward-facing side of the core and along a side of the flange facing inward away from the perimeter of the core.

According to certain embodiments of the present disclosure, method of making a seat back for a passenger seat can be provided. The method can include assembling a first layered assembly including carbon fiber material to form a body of the seat back. The method can include assembling a second layered assembly including carbon fiber material to form a non-tubular flange that extends rearwardly from the body along top and lateral portions of a perimeter of the body. The method can include curing the first layered assembly and the second layered assembly so that the body and the non-tubular flange form an integral piece.

In some embodiments, assembling the first layered assembly including carbon fiber material to form a body of the seat back can include forming a rib of a layered structure including a foam core covered by at least one ply and placing the rib so as to be positioned along a rearward-facing side of the body along at least part of a distance between a top and a bottom of the body when the body and the non-tubular flange have been formed into an integral piece.

In some embodiments, assembling the first layered assembly including carbon fiber material to form a body of the seat back can include forming a cross-beam of a layered structure including a foam core covered by at least one ply and placing the cross-beam so as to be positioned along a rearward-facing side of the body and spanning between portions of the non-tubular flange at opposite lateral side edges of the body when the body and the non-tubular flange have been formed into an integral piece.

In some embodiments, the method can include attaching the cross-beam to the non-tubular flange by positioning a first layer on the cross-beam so that a main portion of the first layer is wrapped about the cross-beam, positioning flaps extending from the main portion of the first layer so as to abut the non-tubular flange, positioning a second layer so that a base portion of the second layer lays against the non-tubular flange and the overlays the flaps of the first layer, positioning a tab extending from the base portion of the second layer so as to overlay at least a portion of the main portion of the first layer on the cross-beam; and positioning a third layer against the cross-beam so as to cover at least part of where the main portion of the first layer is overlaid by the tab and to cover at least part of where the main portion of the first layer is not overlaid by the tab.

In some embodiments, assembling the second layered assembly including carbon fiber material to form the non-tubular flange can include forming the non-tubular flange in regions that include a top region at or near a top of the body, a bottom region at or near a bottom of the body, and a middle region located between the top region and the bottom region. The method can also include adding layers among the regions so that a thickness of the flange in the top region is less than the thickness of the flange in the middle region, so that the thickness of the flange in the middle region is less than the thickness of the flange in the bottom region, so that a depth of the flange in the top region is less than the depth of the flange in the bottom region, and so that the depth of the flange in the middle region curves between the depth of the flange in the top region and the depth of the flange in the bottom region.

In some embodiments, the method further can include assembling a third layered assembly of material to form a rim extending rearwardly from the body along a side of the non-tubular flange facing inward away from the perimeter of the body. The method further can include curing the first layered assembly, the second layered assembly, and the third layered assembly together so that the body, the non-tubular flange, and the rim form an integral piece.

BRIEF DESCRIPTION OF THE DRAWINGS

FIG. 11 is a flowchart illustrating a process that may be used for forming the seat back FIG. 2.

FIG. 12 is a rear perspective view showing regions that may be utilized in construction of the seat back FIG. 2.

FIG. 13 shows a reinforcing member that may be used in construction of the seat back of FIG. 12.

FIG. 14 illustrates a set of layers that may be used in constructing a reinforcing rib when constructing the seat back of FIG. 12.

DETAILED DESCRIPTION

Figure 1:
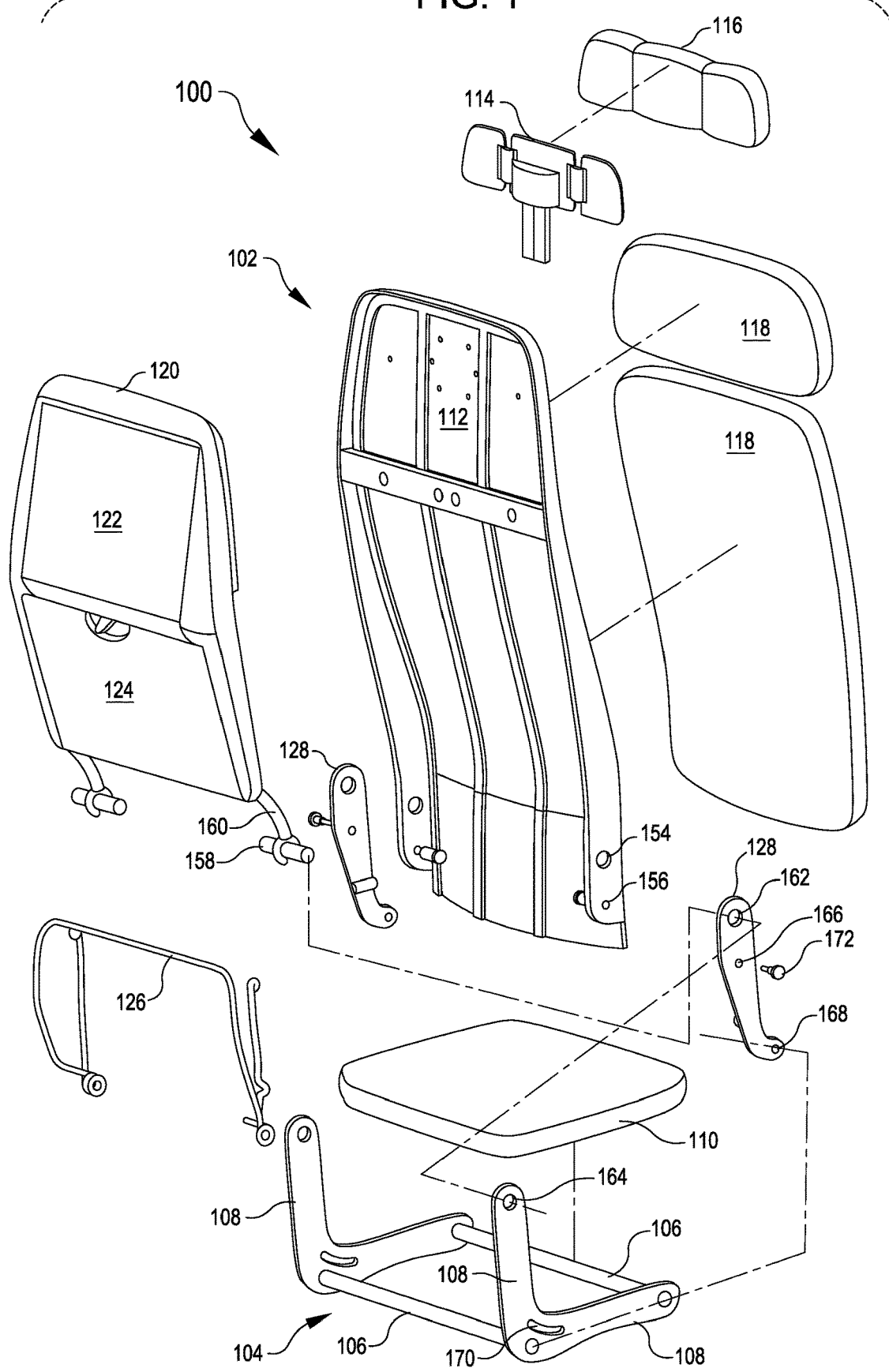
FIG. 1 is an exploded view of elements of a passenger seat, according to certain embodiments of the present disclosure.

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide seat backs and associated elements thereof for passenger seats. While the seat backs are discussed for use with aircraft seats, they are by no means so limited. Rather, embodiments of the seat backs may be used in passenger seats or other seats of any type or otherwise as desired. For example, embodiments may be used on trains, buses, movie theaters, student seating, or any other instance when seats may be useful.

Embodiments of the disclosed seat backs may provide advantages over known seat backs, such as manufacturing cost savings, space savings, and weight savings. In various scenarios, such savings can be achieved while conforming to strength, stiffness, and/or other performance criteria prescribed by safety standards.

In various embodiments, the seat back can include a structural core component that provides support or a mounting structure for receiving other components. The structural core component can be formed as a single piece. A single-piece construction may decrease a complexity of assembly, increase an ease of manufacturing, and/or otherwise reduce costs associated with the seat back.

In various embodiments, the seat back can include a flange extending around a perimeter of a body of the seat back. The body may correspond to a diaphragm that is relatively thin in comparison to the flange. The flange may provide the seat back with structural stiffness and strength and provide resistance to torsion during crash events. The flange may be non-tubular, e.g., having solid material extending between exterior surfaces of the flange. In various aspects, the thickness and/or depth of the flange may vary from place to place along the flange. For example, a portion of the flange near along an upper portion of the seat back may have a smaller thickness and/or depth than along a lower portion of the seat back. In many cases, a particular variation among depths and/or thicknesses of the flange may be selected to obtain a seat back with particular flexibility and/or strength characteristics that may be tailored or otherwise suitable for particular applications or safety standards.

In some aspects, use of a non-tubular flange permits a seat back to be constructed within set size parameters and with suitable strength for meeting safety requirements while also providing a greater amount of space for fitting larger monitors than might have otherwise been possible with a tubular flange that would occupy more space.

Other features individually or collectively may additionally or alternatively be included in the disclosed seat backs. Various examples of features that may be included in disclosed seat backs, along with corresponding advantages over known seat backs, will now be described with reference to the drawings.

According to certain embodiments, as shown in FIG. 1, an aircraft seat 100 includes a seat back portion 102 and a seat pan portion 104. The seat back portion 102 generally corresponds to a portion of the seat 100 that supports a passenger's back when the passenger is seated in the seat 100, while the seat pan portion 104 generally corresponds to a portion of the seat 100 that supports a passenger's buttocks when the passenger is seated in the seat 100.

The seat pan portion 104 shown in FIG. 1 includes bars 106 extending between spreaders 108. Padding 110 or other suitable receiving structure is supported by the bars 106 when the seat pan portion 104 is fully assembled. The seat pan portion 104 may be supported relative to a floor of the aircraft by legs (not shown) that support the seat pan portion 104 from underneath.

The seat back portion 102 shown in FIG. 1 includes a structural core 112. The structural core 112 is configured to receive and support other elements of the seat 100, which may include elements that form at least part of an outermost surface of the seat back 102 when the seat 100 is fully assembled and ready for use. FIG. 1 shows several examples of elements of the seat 100 that can be coupled with the structural core 112. Examples include but are not limited to one or more of the following: a headrest 114, head cushioning 116 (e.g., which may be directly attached to the structural core 112, for example, if the headrest 114 is omitted), back cushioning 118, a shroud 120, a monitor 122, a tray table 124, a storage pocket structure 126, or spreaders 108 (e.g., via recline guide 128).

FIGS. 2-5 respectively show front perspective, right side, rear, and front views of the structural core 112 of the seat back 102 introduced in FIG. 1. The structural core 112 shown in FIGS. 2-5 includes a forward-facing or front side 130, a rearward-facing or rear side 132, a top 134, a bottom 136, a body 138, a flange 140, a cross-beam 142, ribs 144, and a rim 146.

The structural core 112 may be formed as a single piece of carbon fiber composite material. For example, the structural core 112 may be constructed by layered assemblies of carbon fiber composite material combined together and cured to produce a piece in which elements are integrally formed with one another. A specific example of a process that may be used to construct certain embodiments of the structural core 112 is described in more detail below with respect to FIG. 11. However, references to specific options are not intended to preclude the possibility of other alternatives (which may be used individually or in combination with the specific options and/or with others of the alternatives). Examples of alternatives regarding materials include but are not limited to titanium, aluminum, steel, aramid fibers, polycarbonate, polypropylene, other metallic materials, composite materials, or other materials similar to those specifically named. Examples of alternatives regarding manufacturing methods include but are not limited to casting, injection-molding, machining, composite techniques, or other additive and/or subtractive techniques.

The body 138 of the structural core 112 can comprise a panel that other features of the body 138 extend from and/or into. The body 138 may comprise a diaphragm that exhibits a greater flexibility and/or moldability than other elements of the structural core 112. The body 138 can be contoured to match a contour of a person's back or otherwise be shaped to facilitate passenger comfort and/or support during use.

Figure 4:
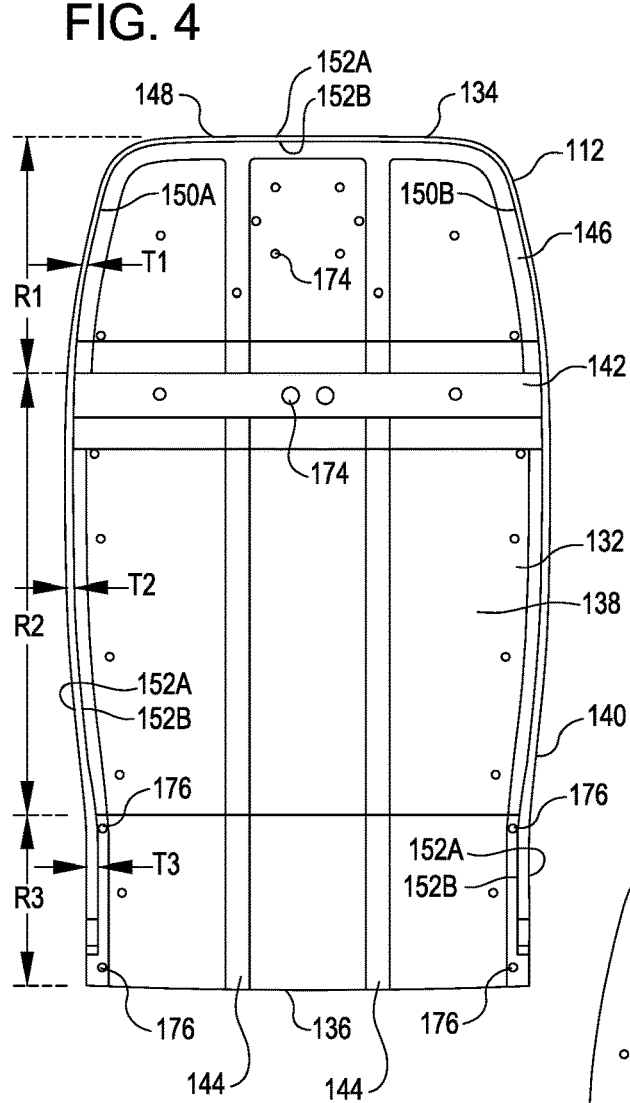
FIG. 4 is a rear view of the seat back of FIG. 2.
Figure 5:
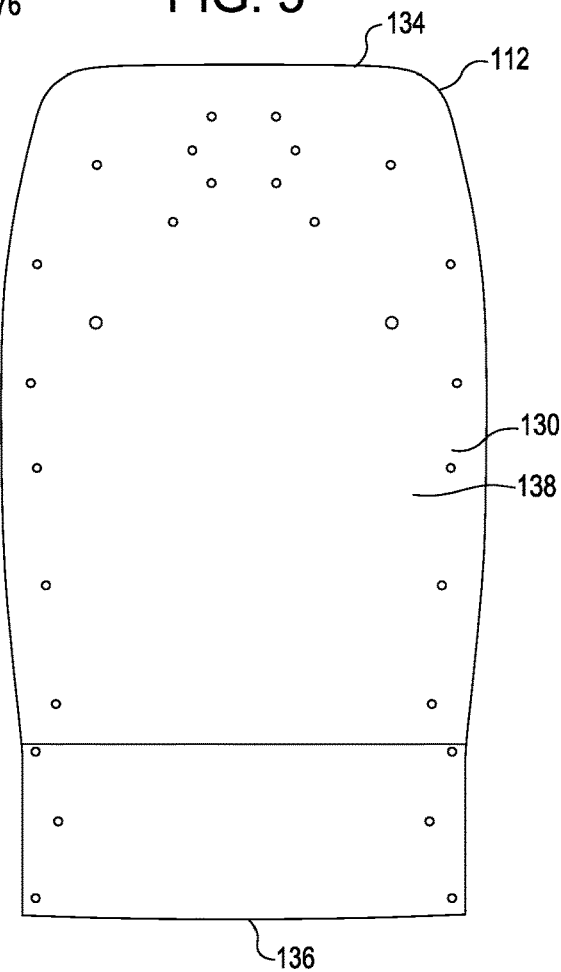
FIG. 5 is a front view of the seat back of FIG. 2.

The flange 140 of the structural core 112 may provide rigidity and/or torsional resistance for the body 138. The illustrated flange 140 extends rearwardly from the body 138 (e.g., as may be best seen in FIG. 2). As best seen in FIG. 4, the flange 140 may extend at least partially along a perimeter of the body 138. For example, in FIG. 4, the flange 140 includes a first lateral portion 150A, a top portion 148, and a second lateral portion 150B that are positioned along the side edges of the body 138 (e.g., visible respectively at the left, top, and right of the view in FIG. 4). The flange 140 may be what is sometimes termed a return flange or a perimeter flange.

The structural core 112 may be utilized in different widths of passenger seats (often referred to as different PAX). In various embodiments, the PAX may be between about 15 inches (about 381 millimeters) and about 20 inches (about 508 millimeters). In further embodiments, the PAX may be between about 16.2 inches (about 411 millimeters) and about 18.95 inches (about 481 millimeters). In a particular embodiment, the PAX may be about 17.05 inches (about 433 millimeters). Some features of the structural core 112 may differ in size or dimension depending on the PAX width for which the structural core 112 is made. Some features of the structural core 112, however, may have a single size or dimension regardless of the PAX width for which the structural core 112 is made. Various sizes and dimensions of elements of the structural core 112 are described in greater detail below.

Figure 3:
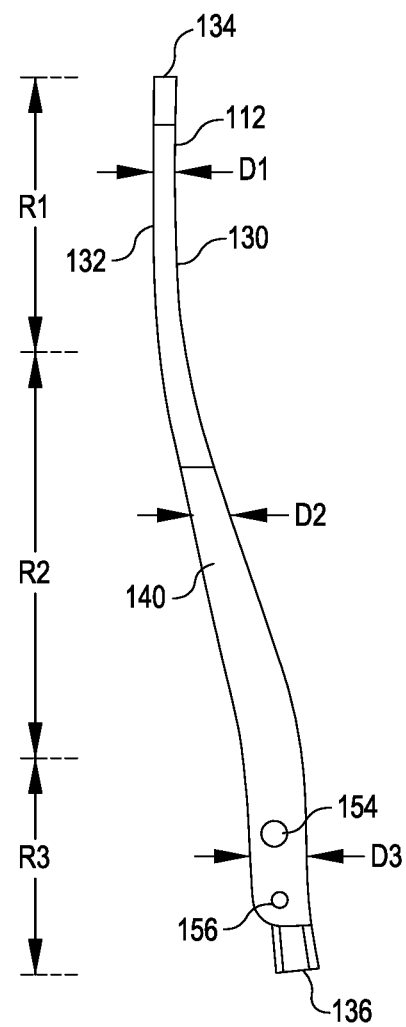
FIG. 3 is a side perspective view of the seat back of FIG. 2.

The flange 140 may extend rearwardly by a rearward depth D (e.g., D1, D2, and D3 in FIG. 3). In some aspects, the rearward depth D of the flange 140 may be variable and be different at different places along the flange 140. In FIG. 3 for example, variations in the rearward depth D of the flange 140 may result in the structural core 112 having different depths D1, D2, and D3 at different positions between the top 134 and bottom 136 of the structural core 112. In the arrangement shown in FIG. 3, the depth D1 in an upper region R1 is relatively constant, the depth D3 in a lower region R3 is also relatively constant and larger than the depth D1, and a depth D2 in a middle region R2 tapers and increases (e.g., increasing from depth D1 to depth D3) as the flange 140 progresses away from the top 134 and toward the bottom 136. In various embodiments, the depth D1 may be between about 0.50 inches (about 12.7 millimeters) and about 1.00 inches (about 25.4 millimeters), and the depth D3 may be between about 1.3 inches (about 33 millimeters) and about 2.3 inches (about 58.4 millimeters). In further embodiments, the depth D1 may be between about 0.70 inches (about 17.8 millimeters) and about 0.80 inches (about 20.3 millimeters), and the depth D3 may be between about 1.7 inches (about 43.2 millimeters) and about 1.9 inches (about 48.3 millimeters). In a particular embodiment, the depth D1 may be about 0.75 inches (about 19 millimeters) and the depth D3 may be about 1.8 inches (about 45.7 millimeters). However, the structural core 112 is not limited to such examples, and may additionally or alternatively include other dimensions and/or other profiles of the flange 140 (e.g., including, but not limited to profiles in which the flange 140 has a constant depth, profiles in which the depth is non-constant within a particular region, and/or profiles in which the flange 140 varies in a pattern that does not exhibit only increases in depth as the flange 140 progresses away from the top 134 and toward the bottom 136).

The flange 140 includes exterior sides 152 (e.g., 152A and 152B in FIG. 4). The exterior sides 152 can correspond to portions of the flange 140 that form an outer surface of the flange 140. For example, the exterior sides 152 of the flange 140 in FIG. 4 include an inward-facing side 152B (e.g., facing inward toward the center of the body 138) and an outward-facing side 152A (e.g., facing outward and away from the center of the body 138).

The flange 140 may have a thickness T (e.g., T1, T2, and T3 in FIG. 4). The thickness T may correspond to the distance extending between the inward-facing side 152B and the outward-facing side 152A. The thickness T may be transverse to the rearward depth D of the flange 140. In some aspects, the thickness T of the flange 140 may be variable and be different at different places along the flange 140. In FIG. 4 for example, variations in the thickness T of the flange 140 may result in the first lateral portion 150A of the flange 140 having different thicknesses T1, T2, and T3 in respective regions R1, R2, and R3. In the arrangement shown in FIG. 4, each of the thicknesses T1, T2, and T3 are relatively constant throughout the respective regions R1, R2, and R3, yet smoothly transition with gentle tapers at the transitions between the regions R1, R2, and R3. In various embodiments, the thicknesses T1 may be between about 0.05 inches (about 1.27 millimeters) and about 0.25 inches (about 6.35 millimeters), the thicknesses T2 may be between about 0.124 inches (about 3.15 millimeters) and about 0.324 inches (about 8.23 millimeters), and the thicknesses T3 may be between about 0.2 inches (about 5.08 millimeters) and about 0.4 inches (about 10.2 millimeters). In further embodiments, the thicknesses T1 may be between about 0.10 inches (about 2.54 millimeters) and about 0.20 inches (about 5.08 millimeters), the thicknesses T2 may be between about 0.174 inches (about 4.42 millimeters) and about 0.274 inches (about 6.96 millimeters), and the thicknesses T3 may be between about 0.25 inches (about 6.35 millimeters) and about 0.35 inches (about 8.89 millimeters). In a particular embodiment, the thicknesses T1 may be about 0.15 inches (about 3.81 millimeters), the thicknesses T2 may be about 0.224 inches (about 5.69 millimeters), and the thicknesses T3 may be about 0.3 inches (about 7.62 millimeters). However, the structural core 112 is not limited to such examples, and may additionally or alternatively include other dimensions and/or other profiles of the flange 140 (e.g., including, but not limited to profiles in which the flange 140 has a constant thickness, profiles in which the thickness is non-constant within a particular region, and/or profiles in which the flange 140 varies in a pattern that does not exhibit only increases in thickness as the flange 140 progresses away from the top 134 and toward the bottom 136).

The flange 140 can be generally solid (e.g., non-tubular or non-hollow). For example, the flange 140 may include solid material spanning the entire thickness between the inward-facing side 152B and the outward-facing side 152A. In various portions of the flange 140, the thickness may be spanned by solid material throughout the entire rearward depth. Indeed, in some embodiments, most portions of the flange 140 are solid throughout the thickness and the depth. This may be the case notwithstanding that certain portions of the flange 140 may have penetrating through-bores or other voids present, for example, for attachment or coupling purposes (such as the pivot bore 154 and control bore 156 that will now be described).

Figure 2:
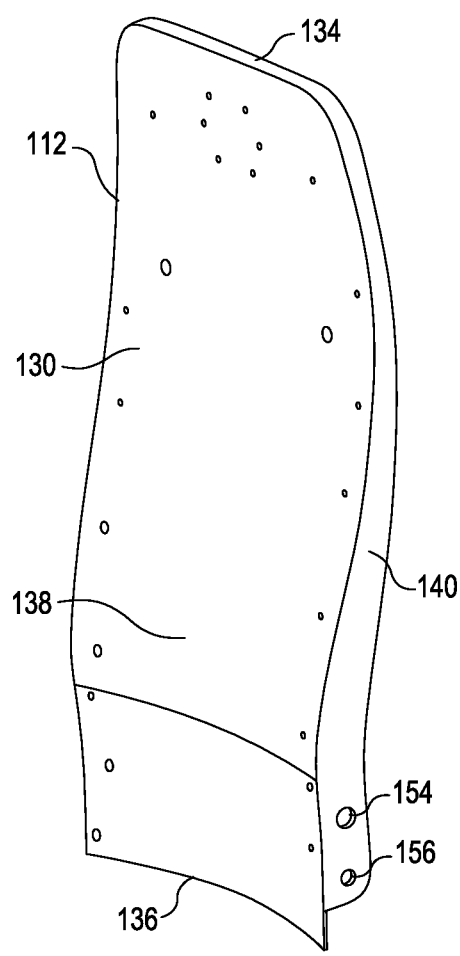
FIG. 2 is a front perspective view of a seat back from the passenger seat of FIG. 1.

Referring to FIGS. 2-3, the flange 140 is shown with a pivot bore 154 and a control bore 156. The pivot bore 154 may be sized and positioned so that the structural core 112 can pivot about the pivot bore 154. This may facilitate reclining of the seat back 102 (FIG. 1). For example, in the arrangement shown in FIG. 1, a shaft 158 is received through the pivot bore 154 of the structural core 112, through an arm 160 of the tray table assembly 124, through a pivot bore 162 of the recline guide 128, and through a pivot bore 164 of spreader 108. This can permit the structural core 112, the arm 160 of the tray table assembly 124, and the recline guide 128 to be pivotable relative to the spreader 108 (which is typically secured to be stationary relative to the aircraft cabin). A fastener 172 extending through the control bore 156 of the structural core 112 and through the control bore 166 of the recline guide 128 provides a constraint that causes the structural core 112 and the recline guide 128 to pivot together. A guide pin 168 extending from the recline guide 128 and into a guide track 170 in the spreader 108 accordingly limits an amount that the structural core 112 can be tilted forward or backward in respective upright and reclined positions. At the same time, the fastener 172 is positioned to permit the arm 160 of the tray table assembly 124 to pivot independently (e.g., so that a position of the tray table assembly 124 when deployed is unaffected by reclining of the structural core 112 and so that the tray table assembly 124 when stowed will follow the position of the structural core 112 regardless of recline state).

The structural core 112 is not limited to the illustrated pivot bore 154 and control bore 156, however. For example, in some embodiments (including in certain instances in which reclining functionality is omitted or provided with different components than described above), either or both of the pivot bore 154 and the control bore 156 may be omitted, may correspond to features that do not extend all the way through the thickness of the flange 140, or may differ in other respects.

As best seen in FIG. 4, the cross-beam 142 of the structural core 112 may be positioned between the lateral portions 150 of the flange 140. For example, in FIG. 4, the cross-beam 142 is positioned horizontally and spans between the first lateral portion 150A and the second lateral portion 150B. The cross-beam 142 may be positioned to provide a suitable mounting interface for mounting and supporting the monitor 122 (FIG. 1) or other screen in the seat back 102 (e.g., at least partially within a space bounded by the cross-beam 142 and the flange 140). In some aspects, the cross-beam 142 may be positioned in the likely path of a passenger's head during a head-impact crash events and thus provide additional strength, energy absorption, or other performance factors that can improve the performance of the seat back 102 during such events.

As may also be seen in FIG. 4, the ribs 144 of the structural core 112 may be positioned at least partially along a span between the top 134 and the bottom 136 of the structural core 112. For example, in FIG. 4, two ribs 144 run vertically from the cross-beam 142 down to the bottom 136 and also from the cross-beam 142 upward. Other options are also possible, including different numbers of ribs 144 (e.g., including one, two, three, or more than three), and/or layouts of the ribs (such as ribs 144 without portions above the cross-beam 142 or with other differing segments). In operation, the ribs 144 may provide a rigidity that helps in preventing an "oil-canning" effect, in which the body 138 of the structural core 112 may otherwise be prone to a flexure in which a popping sound can result that may be irritating to passengers.

As may also be seen in FIG. 4, the rim 146 of the structural core 112 may be positioned alongside the flange 140. For example, in FIG. 4, the rim 146 is located just inward of the flange 140 and along the inward-facing side 152B of the flange 140. The rim 146 may be a built-up portion that provides a suitable surface for bolting or otherwise fastening other elements to the structural core 112. For example, as shown in FIG. 4, the rim 146 may provide a suitable location for securing fastening heads 176 for receiving the storage pocket structure 126 shown in FIG. 1.

The structural core 112 may also include a variety of fastening features 174. The fastening features 174 may be molded into the structural core 112 during a fabrication process. The fastening features 174 may include grooves, threaded holes, ridges, protrusions, or other contoured surfaces configured to facilitate attachment of other elements to the structural core. The structural core 112 may include a suitable combination of fastening features 174 to facilitate attachment to the front side 130, the rear side 132, or both. For example, the headrest 114, the head cushioning 116, and/or the back cushioning 118 may be attached to the front side 130 of the structural core 112, while the shroud 120, the monitor 122, the tray table 124, and/or the storage pocket structure 126 may be attached to the rear side 132 of the structural core 112.

Certain advantages of the structural core 112 introduced in FIG. 1 may be appreciated in comparison to other arrangements used for aircraft seats. For example, some aircraft seats utilize a known seat back structural core 212 such as is represented in FIGS. 6 and 8-10.

Figure 6:
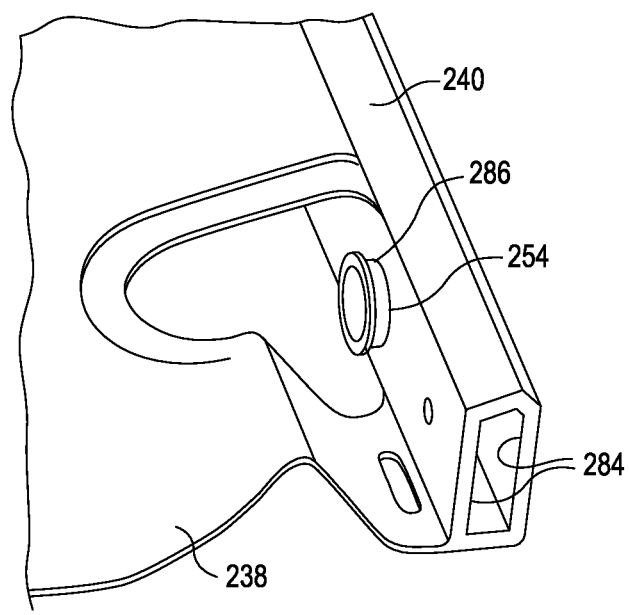
FIG. 6 shows a pivot area of a known seat back relative to which certain advantages of the seat back of FIG. 2 may be appreciated.
Figure 7:
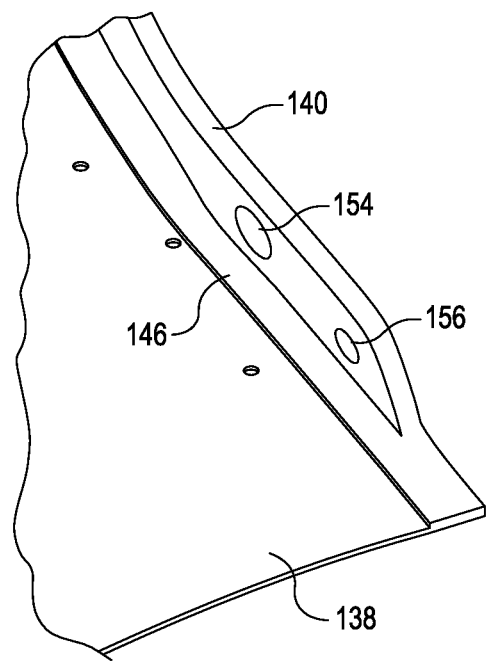
FIG. 7 shows a pivot area of the seat back of FIG. 2.

Referring to FIG. 6, the known seat back structural core 212 includes a tubular flange 240. In many cases, a steel bushing 286 is included through a pivot bore 254 of the known seat back structural core 212. The steel bushing 286 is generally included due to the tube walls 284 of the tubular flange 240 being of insufficient thickness to adequately function as bearing surfaces. In contrast, referring to both FIG. 6 and FIG. 7, the non-tubular flange 140 can be thicker than the individual tube walls 284 and accordingly function as a suitable bearing surface to permit a shaft to bear against the pivot bore 154 without the addition of an extra bushing 286 extending to another load-bearing surface. Thus, in some scenarios, using a non-tubular flange 140 can reduce a number of parts that may otherwise be used.

Figure 8:
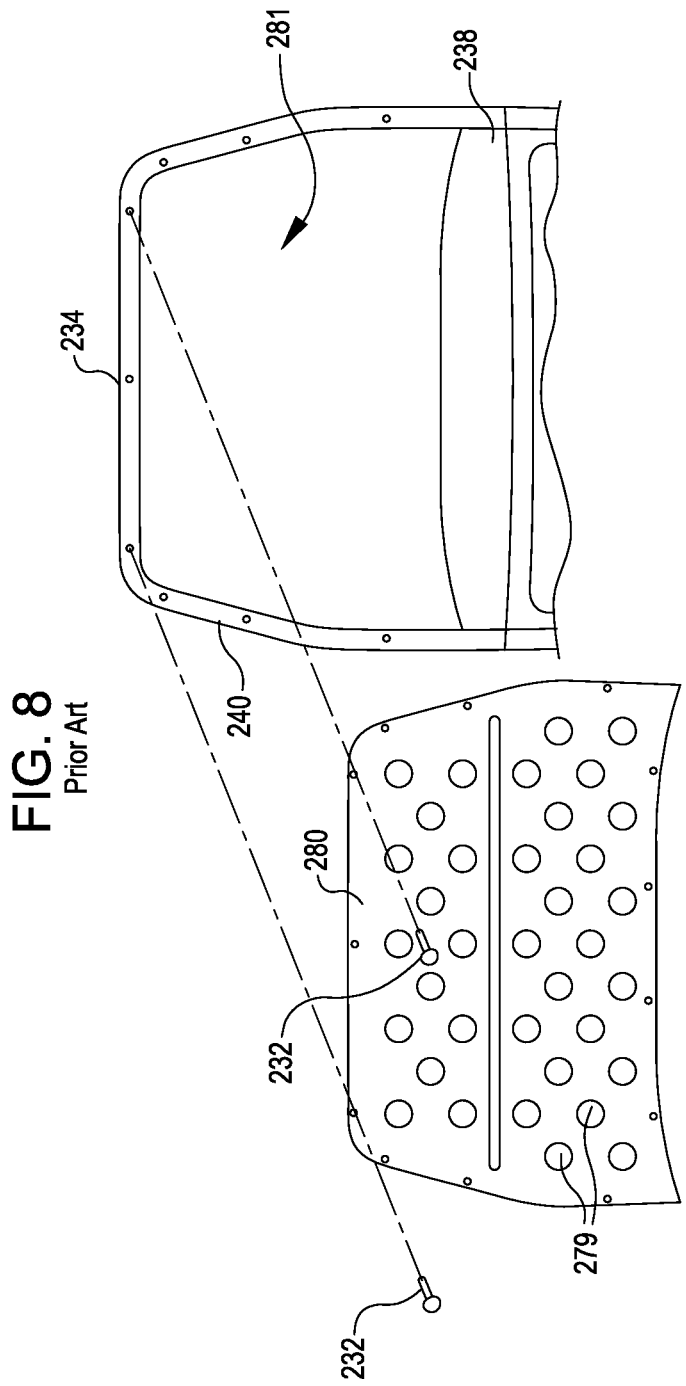
FIG. 8 illustrates an exploded assembly view of the top portion of the known seat of FIG. 6.

FIG. 8 illustrates an exploded assembly view of the top portion of the known seat back structural core 212. The known seat back structural core 212 typically includes a diaphragm 238 that is made out of a fiber glass material and joined with the tubular flange 240 (which is typically constructed from carbon fiber or aluminum material). An aluminum panel 280 is accordingly normally added near a top 234 of the known seat back structural core 212, e.g., to provide an adequate mounting surface for headrests or other features. The aluminum panel 280 is typically positioned to cover a space 281 between the diaphragm 238 and the tubular flange 240. The aluminum panel 280 is typically fastened by rivets 232. Lightening holes 279 are typically introduced into the aluminum panel 280 to reduce an amount of weight contributed known seat back structural core 212. In contrast, many parts and/or operations shown in FIG. 8 may be obviated by use of a structural core 112 introduced in FIG. 1. For example, the structural core 112 introduced in FIG. 1 in many aspects can be constructed without operations of installing the aluminum panel 280, installing rivets 232 to secure the aluminum panel 280, or introducing lightening holes 279 into the aluminum panel 280. Thus, in some scenarios, use of the structural core 112 introduced in FIG. 1 may simplify a construction process.

Moreover, the fully assembled known seat back structural core 212 (including the rivets 232, the aluminum panel 280, the fiber glass body 238, and the tubular flange 240) typically weighs about 3.05 pounds (about 1.38 kilograms) on average. In contrast, the structural core 112 introduced in FIG. 1 (for example, constructed according to the process described with respect to FIG. 11) may weigh about 1.95 pounds (about 0.885 kilogram) on average, yielding a significant weight reduction when multiplied across the many seats included in an aircraft.

In various scenarios, the known seat back structural core 212 and the structural core 112 introduced in FIG. 1 may be sized for use in the same PAX of passenger seat. In many such situations, use of the structural core 112 introduced in FIG. 1 may provide improvements to available space in comparison to the known seat back structural core 212.

Figure 9:
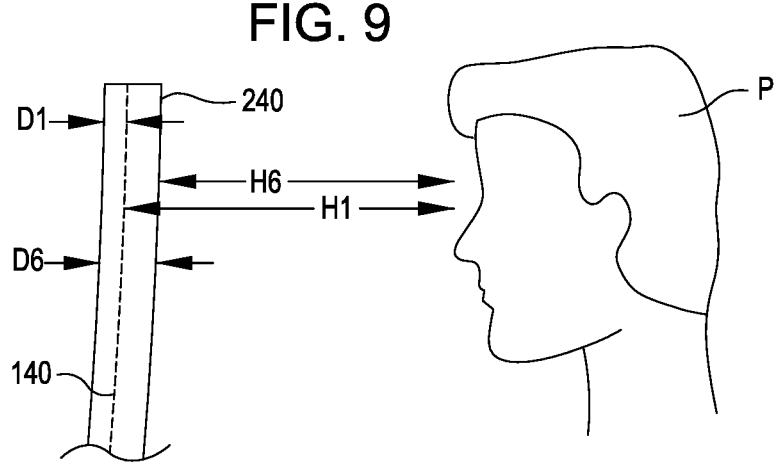
FIG. 9 shows a depth comparison between elements of the seat back of FIG. 2 and elements of the known seat back of FIG. 9.

For example, FIG. 9 illustrates a depth comparison for the tubular flange 240 of FIG. 8 and the non-tubular flange 140 introduced in FIG. 2 along a top portion of a seat back. The rearward edge of tubular flange 240 is shown in solid line, and the rearward edge of the non-tubular flange 140 is shown in phantom line. Because the non-tubular flange 140 has a smaller depth D1 than the depth D6 of the tubular flange 240, the passenger P may experience a greater amount of headspace H3 with the non-tubular flange 140 than an amount of head space H6 that may be experienced with the tubular flange 240. By way of example, typically the tubular flange 240 of the known seat back structural core 212 has a depth D6 along a top of the seat of about 1.40 inches (about 35.6 millimeters). Thus, in comparison to the particular example value given herein of about 0.75 inches (about 19 millimeters) for D1 (FIG. 3), a passenger for the structural core 112 introduced in FIG. 1 might expect to have an appreciable difference of about 0.65 inches (about 16.5 millimeters) more headspace from the next seat forward.

Figure 10:
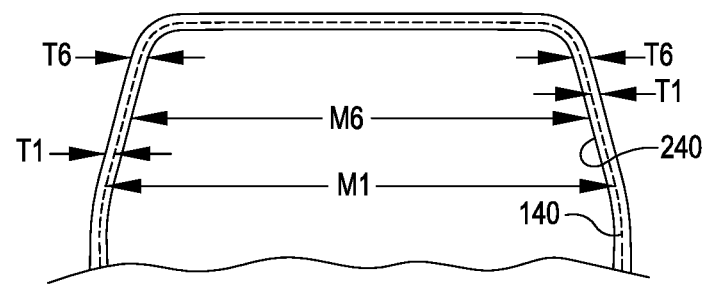
FIG. 10 shows a thickness comparison between elements of the seat back of FIG. 2 and elements of the known seat back of FIG. 9.

FIG. 10 illustrates a thickness comparison for the tubular flange 240 of FIG. 8 and the non-tubular flange 140 introduced in FIG. 2 along a top portion of a seat back. The inward-facing edge of tubular flange 240 is shown in solid line, and the inward-facing edge of the non-tubular flange 140 is shown in phantom line. In FIG. 10, the non-tubular flange 140 has a smaller thickness T1 than the thickness T6 of the tubular flange 240. Accordingly, a seat with the non-tubular flange 140 may include a greater amount of space (e.g., represented by width M1) in which a monitor may be fit, in comparison to an amount of space (e.g., represented by width M6) in which a monitor may be fit when the tubular flange 240 is used. By way of example, typically, the thickness T6 of the tubular flange 240 along a top portion is about 0.5 inches (about 12.7 millimeters). Thus, in comparison to the particular example value given herein of about 0.15 inches (about 3.81 millimeters) for T1 (FIG. 4), and accounting for the thickness occurring on two lateral edges, the structural core 112 introduced in FIG. 1 would have about 0.7 inches (about 17.8 millimeters) of extra space in the width M1 over the width M6. This sort of extra space gained by use of a non-tubular flange 140 can be advantageous because it can permit larger sizes of screens to be installed (which can be a significant factor for increasing passenger comfort).

The structural core 112 introduced in FIG. 1 is also distinguishable over other arrangements used for aircraft seats. For example, the structural core 112 introduced in FIG. 1 may be differentiated from what may be termed a "clamshell" seatback. One example of a clamshell seatback is provided in International Patent Publication Number WO2015/191709, published Dec. 17, 2015, entitled MONOCOQUE AND SEMI-MONOCOQUE PASSENGER SEATS WITH ERGONOMIC DESIGN (hereinafter the '709 Application). In a clamshell seatback, two C-shaped segments are snapped together along their open ends so that the inner surface of the arms of one C-shaped segment press against the outer surface of the arms of the other C-shaped segment. Such engagement of the arms of the C-shaped segments encloses a volume such that elements mounted to the front of a clamshell seatback are mounted against the outward facing surface of one of the C-shaped segments and elements mounted to the rear of the clamshell seatback or mounted against the outward facing surface of the other C-shaped segment. Thus, neither of the C-shaped segments in a clamshell seatback is intended to independently support mounted structures on both an outside and an inside of the C-shaped segment. In contrast, the structural core 112 introduced in FIG. 1 in some embodiments may be configured to have structures mounted on both the front and back. Moreover, in a clamshell seatback, engagement of the arms of the C-shaped segments also provides a reinforcement that allows the clamshell seatback to resist a greater amount of torsion than if only a single C-shaped segment were used. In contrast, the non-tubular flange 140 of the structural core 112 introduced in FIG. 1 does not require engagement with another component for reinforcement and/or for meeting torsional resistance criteria for aircraft seats. Moreover, unlike the two-piece clamshell structure, the structural core 112 introduced in FIG. 1 can be a single unitary structure. Additionally, whereas the clamshell of the '709 Application comprises the outer skin of the seat, the structural core 112 in various embodiments is an element disposed within a seat to provide load-bearing structure to the seat.

As noted previously, the structural core 112 introduced in FIG. 1 can be made in a number of suitable ways and from a number of suitable materials. One specific example will be described now in greater detail. Although specific materials and arrangements are provided by way of example, it should be appreciated that other variations or options may also provide suitable results.

FIG. 11 illustrates a process 1100 for making an example of the structural core 112 introduced in FIG. 1. FIGS. 12-19 illustrate various details that will be referenced with respect to the process 1100 of FIG. 11. For example, FIG. 12 shows three different regions in which layers may be added for building up lateral portions of the flange 140 during the process 1100 of FIG. 11. In FIG. 12, Region I corresponds to a top region at or near a top of the body 138, Region III corresponds to a bottom region at or near a bottom of the body 138, and Region II corresponds to a middle region located between the top region and the bottom region. More specifically, Region III in FIG. 12 extends upward from a bottom of the flange 140, includes the pivot bore 154, and ends shortly after the pivot bore 154. Region II in FIG. 12 extends upward from near the pivot bore 154 (e.g., from the end of Region I), includes the cross-beam 142, and ends along the upper edge of the cross-beam 142. Region I in FIG. 12 extends upward from the upper edge of the cross-beam 142 (e.g., from the end of Region I) and ends at the top of the body 138. However, although particular locations of the ends of Regions I, II, and III have been described, in some embodiments, these ends may be placed differently, including but not limited to, the lower end of Region I being located along a bottom side of the cross-beam 142.

Referring back to FIG. 11, the process 1100 may be used to construct the seatback structural core 112 with fiber-reinforced polymer. The fiber may be carbon fiber and the polymer may be epoxy. To this end, specific sizes and combinations of layers described below correspond to use of layers that include carbon fibers pre-impregnated with an epoxy polymer to reach a weight of about 150 grams (about 5.29 ounces) per square meter (GMS). However, it is contemplated that comparable results may be possible with different weights, different numbers of layers, and/or different materials than those enumerated in these specific examples.

At 1110, the process 1100 includes laminating and placing foam core ribs (e.g., corresponding to the ribs 144 of FIG. 12). This may include laminating (e.g., combining layers) to form a layered sub-assembly for each rib. For example, referring to FIG. 13, the rib may be formed so that it corresponds to a composite member 1390 having a foam core 1392 within layers or plies of carbon fiber epoxy material (e.g., visible as extending flaps 1394 in FIG. 13). The layered assembly for forming the rib can be placed into a groove or other appropriate location on a mold that will also receive additional layers and sub-assemblies that will be formed together into a completed seatback structural core 112. The rib assembly may directly abut the mold or may contact intervening layers positioned on the mold if such intervening layers are present.

FIG. 14 illustrates layers of an example assembly that may be used to form such ribs 144. The rib is built about a foam core 1492. The foam core 1492 may be about 0.1 inches (about 2.54 millimeters) deep, about 0.75 inches (about 19 millimeters) wide, and about 29.0 inches (about 737 millimeters) long. The foam core 1492 may be stacked on top of a single base ply 1491 of carbon fiber epoxy material that generally corresponds to the footprint of the foam core 1492 (e.g., a foot print about 0.75 inches (about 19 millimeters) wide, and about 29.0 inches (about 737 millimeters) long). The single base ply 1491 can have fibers oriented generally along the length of the ply (e.g., having a 0 degree orientation). The foam core 1492 may be wrapped with two wrapping plies 1493 of carbon fiber epoxy material that are sized to span the full length of the foam core 1492 and to extend approximately once around the sides of the foam core 1492 (e.g., a foot print about 1.7 inches (about 43.2 millimeters) wide and about 29.0 inches (about 737 millimeters) long). The two wrapping plies 1493 may respectively have plus 45 degree and minus 45 degree orientations. Two upper plies 1495 may be positioned over the foam core 1492 and may generally correspond to the footprint of the foam core 1492 (e.g., a foot print about 0.75 inches (about 19 millimeters) wide, and about 29.0 inches (about 737 millimeters) long). The two upper plies 1495 may each have a 0 degree orientation). Two end plies 1494 may also be wrapped around each end of the foam core 1492. The end plies 1494 may be positioned so that approximately half of each end ply extends past the end of the foam core 1492 when wrapped. These extending portions may be cut to provide tabs like the flaps 1394 shown in FIG. 13. Each end ply may be sized appropriately to this end, (e.g., with a foot print of about 2.0 inches (about 50.8 millimeters) by about 1.7 inches (about 43.2 millimeters)). Each pair of end plies 1494 may respectively have plus 45 degree and minus 45 degree orientations.

Referring back to FIG. 11, the process 1100 at 1120 includes laminating and placing the foam cored impact beam (e.g., corresponding to the cross-beam 142 of FIG. 12). This may include laminating (e.g., combining layers) to form a layered sub-assembly for the beam. For example, referring to FIG. 13, the beam may be formed so that it corresponds to a composite member 1390 having a foam core 1392 within layers or plies of carbon fiber epoxy material (e.g., visible as extending flaps 1394 in FIG. 13). The layered assembly for forming the beam can be placed into a groove or other appropriate location on the mold, e.g., directly abutting the mold or contacting intervening layers positioned on the mold if such intervening layers are present.

Figure 15:
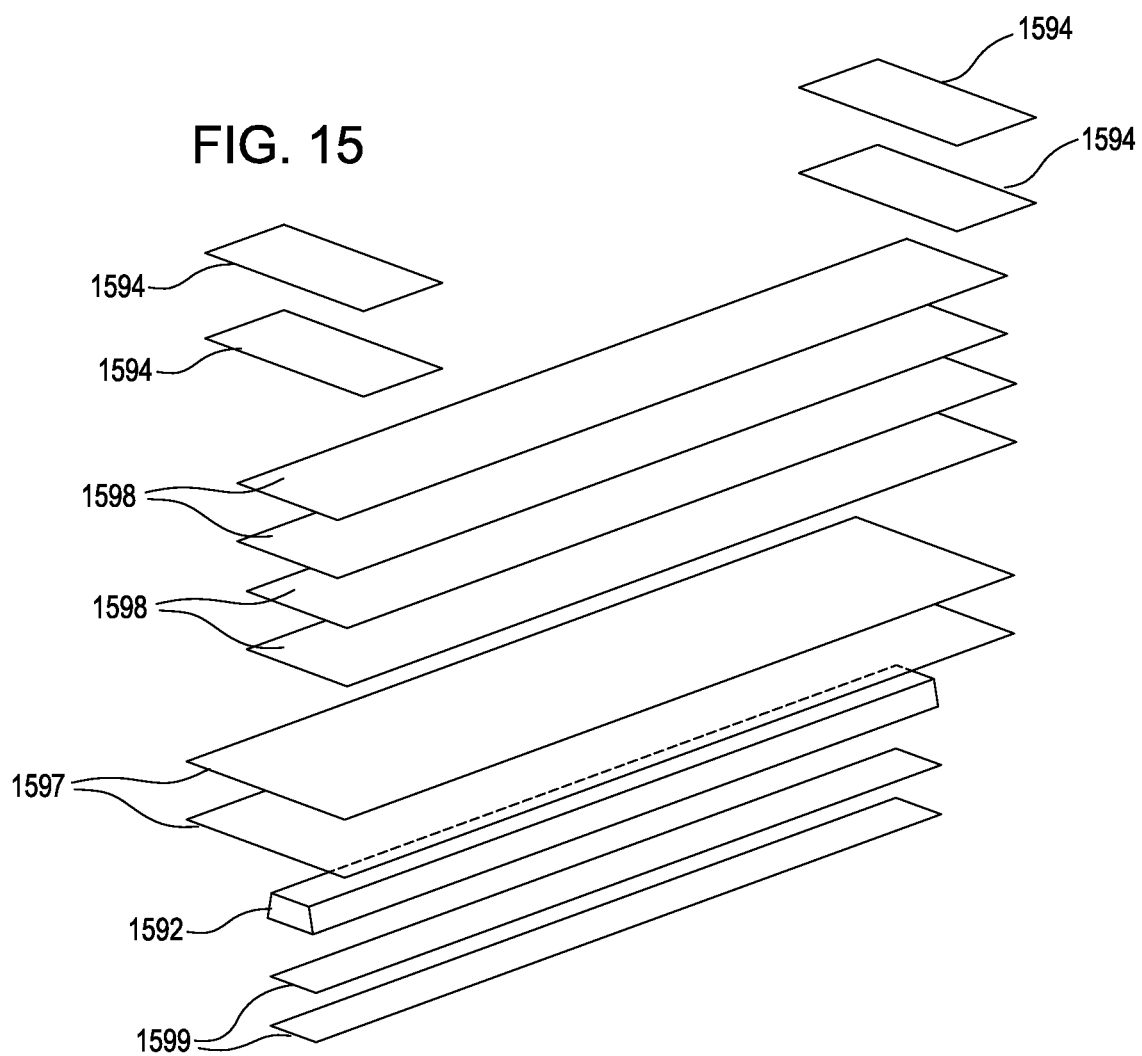
FIG. 15 illustrates a set of layers that may be used to constructing a crossbeam when constructing the seat back of FIG. 12.

FIG. 15 illustrates layers of an example assembly that may be used to form such a cross-beam 142. The beam is built about a foam core 1592. The foam core 1592 may be about 0.5 inches (about 12.7 millimeters) deep, about 1.5 inches (about 38.1 millimeters) wide, and about 16.0 inches (about 406 millimeters) long. The foam core 1592 may be stacked on top of a pair of base plies 1599 of carbon fiber epoxy material that generally correspond to the footprint of the foam core 1592 (e.g., a foot print about 1.5 inches (about 38.1 millimeters) wide and about 16.0 inches (about 406 millimeters) long). The pair of base plies 1599 can have a 0 degree orientation. The foam core 1592 may be wrapped with two full-wrapping plies 1597 of carbon fiber epoxy material that are sized to span the full length of the foam core 1592 and to extend approximately once around the sides of the foam core 1592 (e.g., a foot print about 4.25 inches (about 108 millimeters) wide and about 16.0 inches (about 406 millimeters) long). The two full-wrapping plies 1597 may respectively have plus 45 degree and minus 45 degree orientations. The foam core 1592 may also be wrapped with four partial-wrapping plies 1598 of carbon fiber epoxy material that are sized to span the full length of the foam core 1592 and to extend approximately once across the top side and lateral side of the foam core 1592 without also covering the bottom side of the foam core 1592 (e.g., a foot print about 2.5 inches (about 63.5 millimeters) wide and about 16.0 inches (about 406 millimeters) long). The four partial-wrapping plies 1598 may each have a 0 degree orientation). Two end plies 1594 may also be wrapped around each end of the foam core 1592. The end plies 1594 may be positioned so that approximately half of each end ply extends past the end of the foam core 1592 when wrapped. These extending portions may be cut to provide tabs like the flaps 1394 shown in FIG. 13. Each end ply may be sized appropriately to this end (e.g., with a foot print of about 4.25 inches (about 108 millimeters) by about 3 inches (about 76.2 millimeters)). Each pair of end plies 1594 may respectively have plus 45 degree and minus 45 degree orientations.

Figure 16:
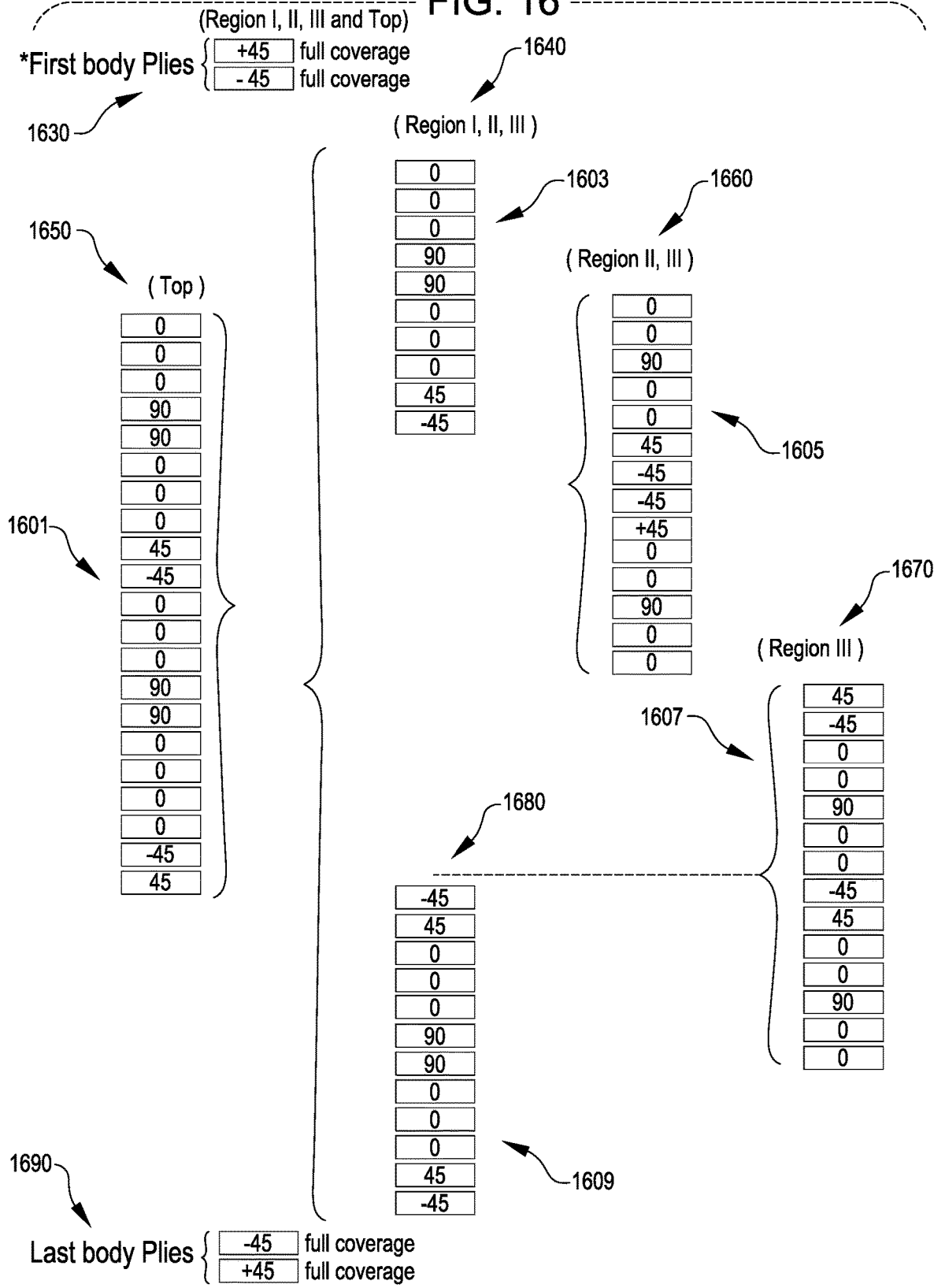
FIG. 16 illustrates a series of layer groups that may be used when constructing the seat back of FIG. 12.

FIG. 16 illustrates a series of layer groups that may contribute to the thickness of the flange 140 being different at different places along the flange 140. FIG. 16 may best be understood with ongoing reference to both FIG. 11 and FIG. 12. FIG. 16 illustrates layer groups that may be added at various points in the process 1100 of FIG. 11, as will be discussed in greater detail below. FIG. 16 also is organized into columns corresponding to different portions of the flange 140 referenced in FIG. 12. For example, the top portion 148 from FIG. 12 is represented in the first and second columns in FIG. 16, Region I from FIG. 12 is represented in the second through third columns in FIG. 16, Region II from FIG. 12 is represented in the second through fourth columns in FIG. 16, and Region III from FIG. 12 is represented in the second through fifth columns in FIG. 16. Thus, layers contributing to the thickness of the flange 140 in any particular portion of the flange 140 from FIG. 12 may be identified by reference to the combination of the layer groups appearing in the columns in FIG. 16 in which that particular area is named. As one illustrative example, layers contributing to the thickness of the flange 140 in Region III from FIG. 12 may be identified by reference to the combination of the layer groups appearing in the second through fifth columns in FIG. 16.

Referring back to FIG. 11, the process 1100 at 1130 includes laminating first body plies. This may include a pair of plies that are oriented at 45 degree and minus 45 degree orientations. The plies added at 1130 may form a portion of the body 138 shown in FIG. 12. These plies may also be applied to extend along portions of the mold that will correspond to the flange 140, the cross-beam 142, and/or the ribs 144 in the completed product. Thus, the body plies added at 1130 may be included in a final thickness of the flange 140. Accordingly, the body plies added at 1130 in FIG. 11 are also represented at 1630 in FIG. 16.

Referring again to FIG. 11, the process 1100 at 1140 includes laminating a first half of a ply stack for the lateral portions 150 of the flange 140. As shown at 1640 in FIG. 16, this may include applying a group of layers 1603 (e.g., with the orientations shown) at Regions I, II, and III from FIG. 12.

Referring again to FIG. 11, the process 1100 at 1150 includes laminating and placing the top portion 148 of the flange 140. As shown at 1650 in FIG. 16, this may include applying a group of layers 1601 (e.g., with the orientations shown) at along the top portion 148 of the flange 140 from FIG. 12.

Referring again to FIG. 11, the process 1100 at 1160 includes placing preplied and debulked laminate stacks in middle and lower lateral portions of the flange 140. As shown at 1660 in FIG. 16, this may include applying a group of layers 1605 (e.g., with the orientations shown) at Regions II and III from FIG. 12. The group of layers 1605 can be debulked in a vacuum process prior to being placed into the mold, for example, to reach about 0.077 inches (about 1.96 millimeters) or another target amount of thickness contributed by the group of layers 1605.

Referring again to FIG. 11, the process 1100 at 1170 includes placing preplied and debulked laminate stacks in the lower lateral portions of the flange 140. As shown at 1670 in FIG. 16, this may include applying a group of layers 1607 (e.g., with the orientations shown) at Region III from FIG. 12. The group of layers 1607 can be debulked in a vacuum process prior to being placed into the mold, for example, to reach about 0.077 inches (about 1.96 millimeters) or another target amount of thickness contributed by the group of layers 1607.

Referring again to FIG. 11, the process 1100 at 1180 includes laminating a second half of a ply stack for the lateral portions 150 of the flange 140. As shown at 1680 in FIG. 16, this may include applying a group of layers 1609 (e.g., with the orientations shown) at Regions I, II, and III from FIG. 12. A portion of the group of layers 1609 may mirror at least a portion of the group of layers 1603.

Referring back to FIG. 11, the process 1100 at 1190 includes laminating the final body plies. This may include a pair of plies that are oriented at minus 45 degree and 45 degree orientations. The plies added at 1130 may form a portion of the body 138 shown in FIG. 12. These plies may also be applied to extend along portions of the mold that will correspond to the flange 140, the cross-beam 142, and/or the ribs 144 in the completed product. Thus, the body plies added at 1190 may be included in a final thickness of the flange 140. Accordingly, the body plies added at 1190 in FIG. 11 are also represented at 1690 in FIG. 16.

Figure 17:
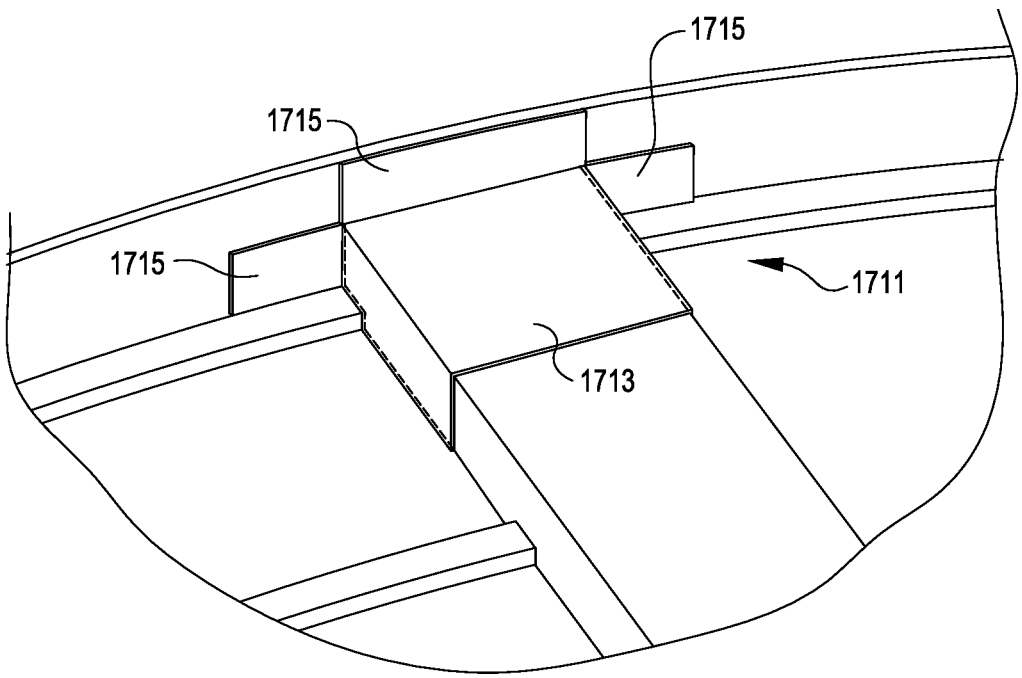
FIGS. 17-19 illustrate an example of layers that may be used for incorporating a crossbeam into the seat back of FIG. 12.
Figure 18:
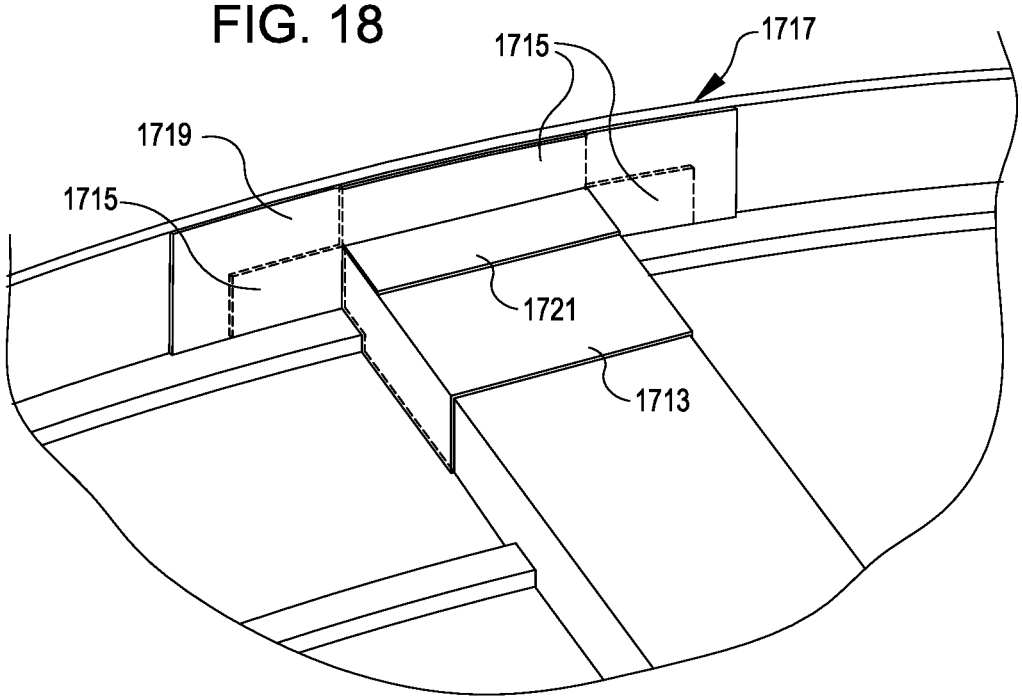
Figure 19:
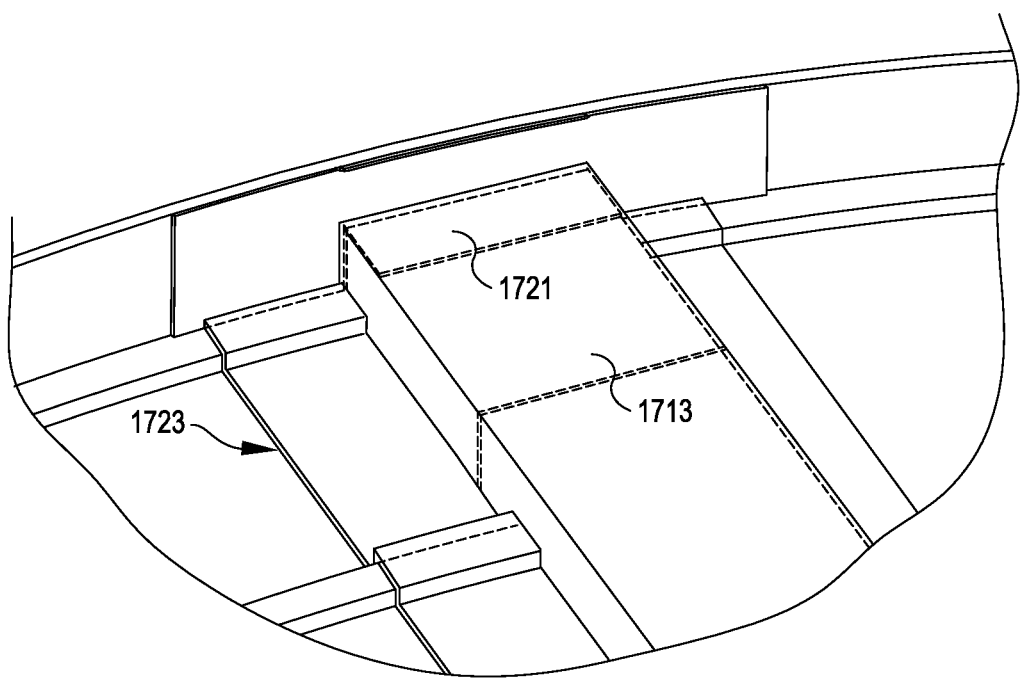

FIGS. 17-19 show particular layers that may be used for incorporating a cross-beam 142 into the flange 140 of FIG. 12. The layers shown in FIGS. 17 19 may be introduced at any suitable place in the process 1100 of FIG. 11, including, but not limited to after placing the beam at 1120 and/or before or after laminating the final body plies at 1190.

Referring to FIG. 17, a first layer 1711 can be positioned on the cross-beam so that a main portion 1713 of the first layer 1711 is wrapped about the cross-beam. Flaps 1715 extending from the main portion 1713 of the first layer 1711 can be positioned so as to abut the flange. For example, this may correspond to a fully-formed portion of the flange (e.g., in which all layers shown in FIG. 16 have been placed) or to a partially-formed portion of the flange (e.g., when fewer than all layers of the flange have been placed). In one example, the first layer 1711 corresponds to two plies of material forming a total thickness of about 0.012 inches (about 0.305 millimeter).

Referring to FIG. 18, a second layer 1717 can be positioned so that a base portion 1719 of the second layer 1717 lays against the flange and the overlays the flaps 1715 of the first layer 1711. A tab 1721 extending from the base portion 1719 of the second layer 1717 can be positioned so as to overlay at least a portion of the main portion 1713 of the first layer 1711 on the cross-beam. In one example, the second layer 1717 corresponds to a single ply of material forming a total thickness of about 0.006 inches (about 0.152 millimeter).

Referring to FIG. 19, a third layer 1723 can be positioned against the cross-beam so as to cover at least part of where the main portion 1713 of the first layer 1711 is overlaid by the tab 1721 and to cover at least part of where the main portion 1713 of the first layer 1711 is not overlaid by the tab 1721. In this way, the first layer 1711, second layer 1717, and third layer 1723 may provide a secure tie-in for joining the cross-beam (e.g., 142 of FIG. 12) to the flange (e.g., 140 of FIG. 12). In one example, the third layer 1723 corresponds to two plies of material forming a total thickness of about 0.012 inches (about 0.305 millimeter).

Upon completion of the layup process, the elements combined in the process of FIG. 11 can be subjected to a suitable curing process with an appropriate combination of time, heat, and/or pressure to form the various layers into a single integrally-formed piece.

In some aspects, an apparatus is provided according to one or more of the following examples or according to some combination of the elements thereof. In some aspects, features of an apparatus described in one or more of these examples can be utilized to perform a method, or features described in the context of a method may be included in an apparatus.

EXAMPLE #1

A seat back for a passenger seat, the seat back comprising: a unitary structural core formed as a single piece, the unitary structural core comprising: (A) a body comprising carbon fiber composite material, the body further comprising a forward-facing side and a rearward-facing side; and (B) a non-tubular flange comprising carbon fiber composite material, the non-tubular flange integrally formed with the body and comprising portions extending from the rearward-facing side of the body respectively along a left lateral side edge, a top side edge, and a right lateral side edge of the unitary structural core.

EXAMPLE #2

The seat back of Example #1, or any of the preceding or subsequent examples, wherein the non-tubular flange comprises: (A) a depth extending rearwardly from the rearward-facing side of the body; and (B) a thickness transverse to the depth and corresponding to a distance between an inward-facing side of the non-tubular flange and an outward-facing side of the non-tubular flange, wherein the non-tubular flange comprises solid material spanning the thickness.

EXAMPLE #3

The seat back of Example #2, or any of the preceding or subsequent examples, wherein the thickness of the non-tubular flange varies such that the thickness of the non-tubular flange is greater near a bottom of the unitary structural core than near a top of the unitary structural core.

EXAMPLE #4

The seat back of any of the preceding or subsequent examples, further comprising at least one rib positioned along the rearward-facing side of the body along at least part of a distance between a top and a bottom of the unitary structural core, the at least one rib formed of a layered structure comprising a foam core covered by at least one ply.

EXAMPLE #5

The seat back of any of the preceding or subsequent examples, further comprising a cross-beam positioned along the rearward-facing side of the body and spanning between portions of the non-tubular flange at opposite lateral side edges of the unitary structural core, the cross-beam formed of a layered structure comprising a foam core covered by at least one ply.

EXAMPLE #6

The seat back of Example #5, or any of the preceding or subsequent examples, wherein the cross-beam is located on the unitary structural core at an upper position so as to absorb energy during a passenger head-impact event.

EXAMPLE #7

The seat back of any of the preceding or subsequent examples, further comprising a rim integrally formed with the body and comprising portions extending rearwardly from the rearward-facing side of the body along the inward-facing side of the non-tubular flange.

EXAMPLE #8

A passenger seat comprising: (A) a seat pan; and (B) a seat back unitary structural core comprising a flange extending rearwardly along top and lateral portions of a perimeter of the core, the flange comprising carbon fiber composite material, the flange having a rearward depth and a thickness transverse to the rearward depth, the thickness corresponding to a distance between exterior sides of the flange, wherein the flange comprises solid material spanning the entire thickness through the entire rearward depth at least along some portion of the flange.

EXAMPLE #9

The passenger seat of Example #8, or any of the preceding or subsequent examples, further comprising: (A) at least one of cushioning or a headrest mounted to a front of the seat back unitary structural core; and (B) a monitor mounted to a rear of the seat back unitary structural core.

EXAMPLE #10

The passenger seat of Example #8 or 9, or any of the preceding or subsequent examples, wherein the flange comprises a bore extending through the thickness and exterior sides of the flange, wherein the seat back unitary structural core is configured for pivoting about a shaft received by the bore, wherein the thickness of the flange is configured to permit the shaft to bear against the bore without a bushing extending to another load-bearing surface.

EXAMPLE #11

The passenger seat of Example #10, or any of the preceding or subsequent examples, further comprising a cross-beam spanning between portions of the flange at opposite lateral side edges of the seat back unitary structural core, the cross-beam configured to support a monitor at least partially within a space bounded by the cross-beam and the flange.

EXAMPLE #12

The passenger seat of Example #11, or any of the preceding or subsequent examples, wherein the seat back unitary structural core comprises: (A) a first region extending above the cross-beam; (B) a third region including the bore and a portion of the flange extending below the bore; and (C) a second region located between the first region and the third region; wherein at least one of the thickness of the flange or the rearward depth of the flange varies so as to be less in the first region than in the second region and less in the second region than in the third region.

EXAMPLE #13

The passenger seat of any of claims 8-12, or any of the preceding or subsequent examples, wherein the seat back unitary structural core comprises at least two ribs extending rearwardly and located along at least part of a distance between a top and a bottom of the seat back unitary structural core, each of the at least two ribs formed as a layered structure comprising a foam core covered by at least one ply.

EXAMPLE #14

The passenger seat of any of claims 8-13, or any of the preceding or subsequent examples, wherein the seat back unitary structural core comprises a rim integrally formed along at least some of the perimeter of the core and comprising portions extending rearwardly from a rearward-facing side of the core and along a side of the flange facing inward away from the perimeter of the core.

EXAMPLE #15

A method of making a seat back for a passenger seat, the method comprising: (A) assembling a first layered assembly comprising carbon fiber material to form a body of the seat back; (B) assembling a second layered assembly comprising carbon fiber material to form a non-tubular flange that extends rearwardly from the body along top and lateral portions of a perimeter of the body; and (C) curing the first layered assembly and the second layered assembly so that the body and the non-tubular flange form an integral piece.

EXAMPLE #16

The method of Example #15, or any of the preceding or subsequent examples, wherein assembling the first layered assembly comprising carbon fiber material to form a body of the seat back comprises: (A)forming a rib of a layered structure comprising a foam core covered by at least one ply; and (B) placing the rib so as to be positioned along a rearward-facing side of the body along at least part of a distance between a top and a bottom of the body when the body and the non-tubular flange have been formed into an integral piece.

EXAMPLE #17

The method of any of claims 15-16, or any of the preceding or subsequent examples, wherein assembling the first layered assembly comprising carbon fiber material to form a body of the seat back comprises: (A) forming a cross-beam of a layered structure comprising a foam core covered by at least one ply; and (B) placing the cross-beam so as to be positioned along a rearward-facing side of the body and spanning between portions of the non-tubular flange at opposite lateral side edges of the body when the body and the non-tubular flange have been formed into an integral piece.

EXAMPLE #18

The method of any of claims 15-17, or any of the preceding or subsequent examples, further comprising attaching the cross-beam to the non-tubular flange by: (A) positioning a first layer on the cross-beam so that a main portion of the first layer is wrapped about the cross-beam; (B) positioning flaps extending from the main portion of the first layer so as to abut the non-tubular flange; (C) positioning a second layer so that a base portion of the second layer lays against the non-tubular flange and the overlays the flaps of the first layer; (D) positioning a tab extending from the base portion of the second layer so as to overlay at least a portion of the main portion of the first layer on the cross-beam; and (E) positioning a third layer against the cross-beam so as to cover at least part of where the main portion of the first layer is overlaid by the tab and to cover at least part of where the main portion of the first layer is not overlaid by the tab.

EXAMPLE #19

The method of any of claims 15-18, or any of the preceding or subsequent examples, wherein assembling the second layered assembly comprising carbon fiber material to form the non-tubular flange comprises: (A) forming the non-tubular flange in regions that comprise: (1) a top region at or near a top of the body; (2) a bottom region at or near a bottom of the body; and (3) a middle region located between the top region and the bottom region; and (B) adding layers among the regions so that: (1) a thickness of the flange in the top region is less than the thickness of the flange in the middle region; (2) the thickness of the flange in the middle region is less than the thickness of the flange in the bottom region; (3) a depth of the flange in the top region is less than the depth of the flange in the bottom region; and (4) the depth of the flange in the middle region curves between the depth of the flange in the top region and the depth of the flange in the bottom region.

EXAMPLE #20

The method of any of claims 15-18, or any of the preceding or subsequent examples, further comprising: (A) assembling a third layered assembly of material to form a rim extending rearwardly from the body along a side of the non-tubular flange facing inward away from the perimeter of the body; and (B) curing the first layered assembly, the second layered assembly, and the third layered assembly together so that the body, the non-tubular flange, and the rim form an integral piece.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat back for a passenger seat, the seat back comprising:
   a unitary structural core formed as a single piece, the unitary structural core comprising:
      a body comprising carbon fiber composite material, the body further comprising a forward-facing side and a rearward-facing side; and
      a non-tubular flange comprising carbon fiber composite material, the non-tubular flange integrally formed with the body and comprising portions extending from the rearward-facing side of the body respectively along a left lateral side edge, a top side edge, and a right lateral side edge of the unitary structural core, wherein the non-tubular flange comprises:
   a depth extending rearwardly from the rearward-facing side of the body; and
   a thickness transverse to the depth and corresponding to a distance between an inward-facing side of the non-tubular flange and an outward-facing side of the non-tubular flange, wherein the thickness of the non-tubular flange varies such that the thickness of the non-tubular flange is greater near a bottom of the unitary structural core than near a top of the unitary structural core.

2. The seat back of claim 1, further comprising at least one rib positioned along the rearward-facing side of the body along at least part of a distance between a top and a bottom of the unitary structural core, the at least one rib formed of a layered structure comprising a foam core covered by at least one ply.

3. The seat back of claim 1, further comprising a cross-beam positioned along the rearward-facing side of the body and spanning between portions of the non-tubular flange at opposite lateral side edges of the unitary structural core, the cross-beam formed of a layered structure comprising a foam core covered by at least one ply.

4. The seat back of claim 3, wherein the cross-beam is located on the unitary structural core at an upper position so as to absorb energy during a passenger head-impact event.

5. The seat back of claim 1, further comprising a rim integrally formed with the body and comprising portions extending rearwardly from the rearward-facing side of the body along the inward-facing side of the non-tubular flange.

6. The seat back of claim 1, wherein the seat back is incorporated into a passenger seat further comprising
   a seat pan wherein the flange comprises solid material spanning the entire thickness through the entire depth at least along some portion of the flange.

7. The passenger seat of claim 6, further comprising:
at least one of cushioning or a headrest mounted to a front of the seat back unitary structural core; and
a monitor mounted to a rear of the seat back unitary structural core.

8. The passenger seat of claim 6, wherein the flange comprises a bore extending through the thickness and exterior sides of the flange, wherein the seat back unitary structural core is configured for pivoting about a shaft received by the bore, wherein the thickness of the flange is configured to permit the shaft to bear against the bore without a bushing extending to another load-bearing surface.

9. The passenger seat of claim 6, further comprising a cross-beam spanning between portions of the flange at opposite lateral side edges of the seat back unitary structural core, the cross-beam configured to support a monitor at least partially within a space bounded by the cross-beam and the flange.

10. The passenger seat of claim 9, wherein the seat back unitary structural core comprises:
a first region extending above the cross-beam;
a third region including a bore and a portion of the flange extending below the bore; and
a second region located between the first region and the third region;
wherein at least one of the thickness of the flange or the depth of the flange varies so as to be less in the first region than in the second region and less in the second region than in the third region.

11. The passenger seat of claim 6, wherein the seat back unitary structural core comprises at least two ribs extending rearwardly and located along at least part of a distance between a top and a bottom of the seat back unitary structural core, each of the at least two ribs formed as a layered structure comprising a foam core covered by at least one ply.

12. The passenger seat of claim 6, wherein the seat back unitary structural core comprises a rim integrally formed along at least some of the perimeter of the core and comprising portions extending rearwardly from a rearward-facing side of the core and along a side of the flange facing inward away from the perimeter of the core.

13. A method of making a seat back for a passenger seat, the method comprising:
assembling a first layered assembly comprising carbon fiber material to form a body of the seat back;
assembling a second layered assembly comprising carbon fiber material to form a non-tubular flange that extends rearwardly from the body along top and lateral portions of a perimeter of the body via a process that comprises at least:
forming the non-tubular flange in regions that comprise:
a top region at or near a top of the body;
a bottom region at or near a bottom of the body; and
a middle region located between the top region and the bottom region; and
adding layers among the regions so that:
a thickness of the flange in the top region is less than the thickness of the flange in the middle region;
the thickness of the flange in the middle region is less than the thickness of the flange in the bottom region;
a depth of the flange in the top region is less than the depth of the flange in the bottom region; and
the depth of the flange in the middle region curves between the depth of the flange in the top region and the depth of the flange in the bottom region; and
curing the first layered assembly and the second layered assembly so that the body and the non-tubular flange form an integral piece.

14. The method of claim 13, wherein assembling the first layered assembly comprising carbon fiber material to form a body of the seat back comprises:
forming a rib of a layered structure comprising a foam core covered by at least one ply; and
placing the rib so as to be positioned along a rearward-facing side of the body along at least part of a distance between a top and a bottom of the body when the body and the non-tubular flange have been formed into an integral piece.

15. The method of claim 13, wherein assembling the first layered assembly comprising carbon fiber material to form a body of the seat back comprises:
forming a cross-beam of a layered structure comprising a foam core covered by at least one ply; and
placing the cross-beam so as to be positioned along a rearward-facing side of the body and spanning between portions of the non-tubular flange at opposite lateral side edges of the body when the body and the non-tubular flange have been formed into an integral piece.

16. The method of claim 15, further comprising attaching the cross-beam to the non-tubular flange by:
positioning a first layer on the cross-beam so that a main portion of the first layer is wrapped about the cross-beam;
positioning flaps extending from the main portion of the first layer so as to abut the non-tubular flange;
positioning a second layer so that a base portion of the second layer lays against the non-tubular flange and the overlays the flaps of the first layer;
positioning a tab extending from the base portion of the second layer so as to overlay at least a portion of the main portion of the first layer on the cross-beam; and
positioning a third layer against the cross-beam so as to cover at least part of where the main portion of the first layer is overlaid by the tab and to cover at least part of where the main portion of the first layer is not overlaid by the tab.

17. The method of claim 13, further comprising:
assembling a third layered assembly of material to form a rim extending rearwardly from the body along a side of the non-tubular flange facing inward away from the perimeter of the body; and
curing the first layered assembly, the second layered assembly, and the third layered assembly together so that the body, the non-tubular flange, and the rim form an integral piece.

18. A seat back for a passenger seat, the seat back comprising:
a unitary structural core formed as a single piece, the unitary structural core comprising:
a body comprising carbon fiber composite material, the body further comprising a forward-facing side and a rearward-facing side; and
a non-tubular flange comprising carbon fiber composite material, the non-tubular flange integrally formed with the body and comprising portions extending from the rearward-facing side of the body respectively along a left lateral side edge, a top side edge, and a right lateral side edge of the unitary structural core;

wherein the seat back further comprises at least one of:
at least one rib positioned along the rearward-facing side of the body along at least part of a distance between a top and a bottom of the unitary structural core, the at least one rib formed of a layered structure comprising a foam core covered by at least one ply;
a cross-beam positioned along the rearward-facing side of the body and spanning between portions of the non-tubular flange at opposite lateral side edges of the unitary structural core, the cross-beam formed of a layered structure comprising a foam core covered by at least one ply; or
a rim integrally formed with the body and comprising portions extending rearwardly from the rearward-facing side of the body along an inward-facing side of the non-tubular flange.

* * * * *